Dec. 29, 1925.  
A. FERGUSON  
1,567,934
PROCESS AND APPARATUS FOR REDUCING ORES AND PRODUCING CEMENT
Filed March 13, 1925
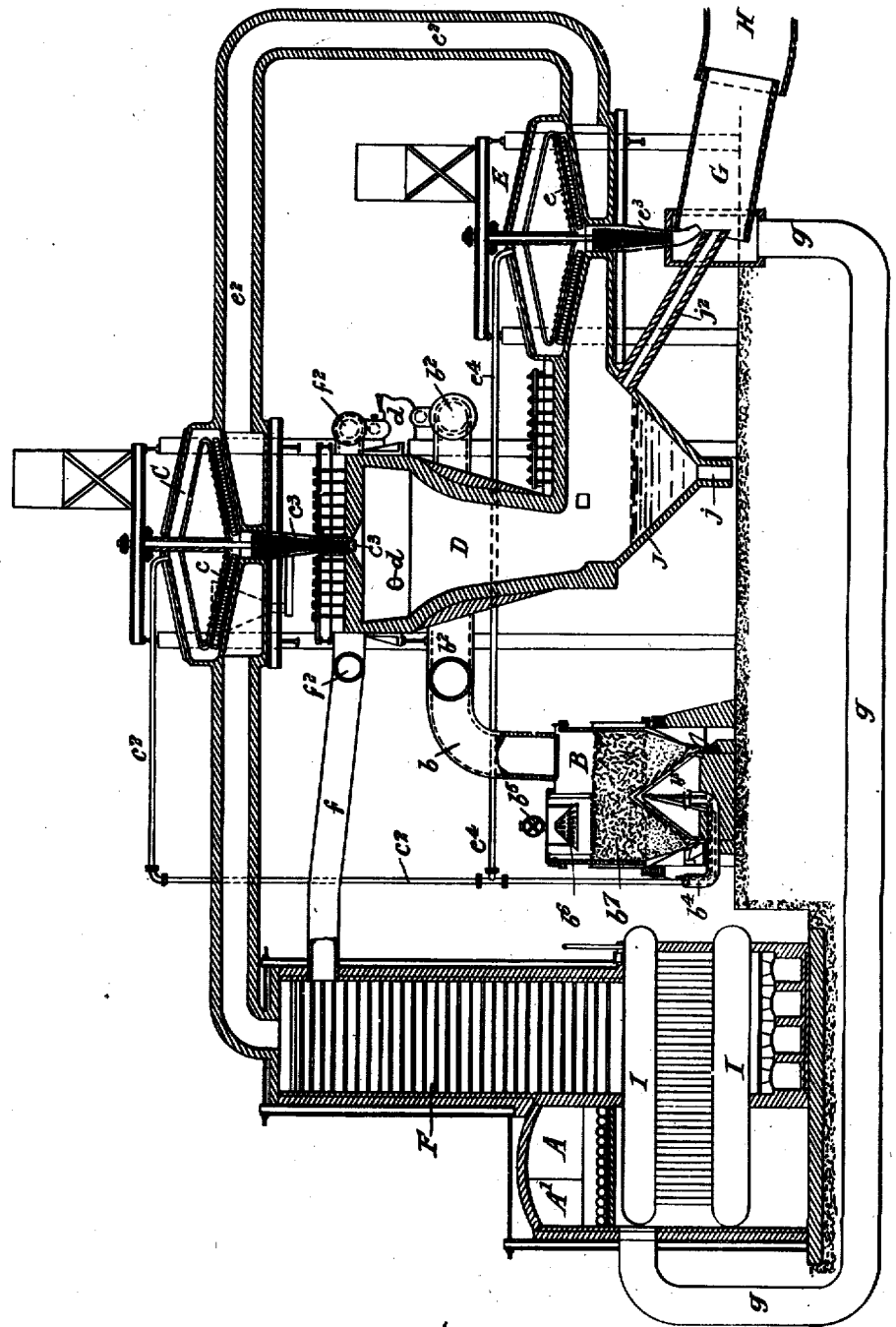
INVENTOR:-
ALEXANDER FERGUSON by his
attorneys Howson and Howson Patented Dec. 29, 1925.

1,567,934

UNITED STATES PATENT OFFICE.

ALEXANDER FERGUSON, OF LONDON, ENGLAND.

PROCESS AND APPARATUS FOR REDUCING ORES AND PRODUCING CEMENT.

Application filed March 13, 1925. Serial No. 15,370.

*To all whom it may concern:*

Be it known that I, ALEXANDER FERGUSON, a subject of the King of Great Britain, residing at 104 Addison Gardens, in the county of London, England, have invented new and useful Improvements in Processes and Apparatus for Reducing Ores and Producing Cement (for which I filed an application in Great Britain Dec. 19, 1923), of which the following is a specification.

This invention relates to processes of and apparatus for smelting or reducing segregated particles of ore in which the material to be treated is delivered in a constant stream and spread in a fine cloud into an enlarged space in the upper part of a furnace.

The object of this invention is to provide improved means whereby oxide ores and especially iron oxide ores can be smelted or reduced with facility and economy. A further object is the continuous production of the metal (which for the purposes of description will be referred to as iron) and its economical production in superior quality.

The present invention mainly consists in the steps of introducing into the top of a furnace and spreading therein finely divided metallic ore, having intermixed therewith any desired ingredients of cement making material as fluxes. This material is introduced in the form of a fine cloud of preheated segregated particles of dust at the top of a furnace of trumpet-like form having curved and inclined walls presenting a space contracting in cross-sectional area from the upper part to the lower part, communicating at the bottom with a receptacle for receiving the molten iron. The iron in its passage through this furnace is subjected to heat from a rapidly rotating or whirling flame produced by the combustion of air and gas admitted tangentially into the furnace. The material is introduced into an enlarged space situated above the entrance of the combustible gases into the furnace, and heated by the radiant heat of the flame. In this space the slags are fused and together with the semi-fused segregated particles of iron are sucked from this enlarged space into the vortex created by the whirling gases, which subject them to such heat that the iron particles are reduced, becoming quite fluid and of low viscosity. Through the action of the whirling combustion gases the now molten material will be expelled by centrifugal force out of the whirling gases and onto the converging walls of the furnace down which the fused and reduced material will then roll into a receptacle. I employ (beside the metallic ore) any necessary fluxes, which may be of the kind employed in smelting iron in blast furnaces and are such as will serve to form slags, to make, or assist in making, cement, so that the reduction, or smelting, of the ore and the production of both iron and cement can be carried on simultaneously and great economy of heat be realized (consequent on the use of carbon dioxide from the carbonate of lime of the fluxes and the great reduction of nitrogen usually accompanying air in blast furnaces) as compared with processes in which the operations of smelting, or reduction with air and solid fuel, or oil, and cement making, are carried on separately and consequently I effect great saving in fuel as well as expediting the processes.

The fuel can be retorted in a chamber, or retort, practically free from air, and a soft coke be produced, by low temperature carbonization, the said coke being eminently suitable for use in a gas producer, which may constitute part of the plant, the gases from the retorted fuel being used to enrich the producer gases in the gas flue if so desired.

The ore and fluxing material in the requisite state as regards fineness of division and heat are passed to above the inlet to the aforesaid furnace, preferably through another preheater, in which the finely divided mixture of fluxing material and ore thoroughly mixed, is raised to a higher temperature, say to, or about, 1000° centigrade, to drive off the carbon-dioxide in the fluxes. Owing to the endothermic reaction in thus driving off the carbon-dioxide the temperature will be lowered and the said mixture will enter the furnace at a temperature of say about 850° centigrade. The ore and fluxing material enter the furnace together and are spread out in the form of a cloud of segregated particles of dust which are fused in the upper part of the furnace and then sucked into the vortex created by the whirling gases from the gas producer and are taken up thereby and whirled round the furnace, the necessary reactions occurring immediately owing to the high temperature obtained (say about 1,800° centigrade) at this point and to the large surface exposed by the smallness of the particles under reaction, the liquefied particles of slag as soon as they are formed, being expelled, along with the liquefied particles of iron, onto the walls of the furnace by the centrifugal action, the said slag and iron descending against the inclined and converging walls of the furnace to a crucible, or the equivalent, below, into which the lower end of the furnace opens, whilst the volatile matters and products of combustion, whirling around and drawn to the centre of the furnace and away from its walls, escape, and if desired any of the said volatile matters and products of combustion which may be valuable can be recovered by ordinary or any suitable means. The iron separates by gravity, in the said crucible, or its equivalent, over which the combustion products pass at a high temperature and maintain the slag and iron fluid. The liquefied iron is tapped off as required at a temperature of 1600° centigrade the slags overflowing into a rotating clinkering drum, or other mixer, wherein they may be joined by, and mixed with, other cement-making ingredients, heated to say about 1000° centigrade, to drive off carbon-dioxide and then the temperature of the escaping gases will have lowered from say about 1,800° to about 1,550° centigrade and the clinker to about 1,350° centigrade, that is to the temperature of cement clinker. The mass is then cooled, which may be done in a rotary cooler by which the air, for the combustion of the carbon-monoxide from the producer that may be needed in excess of the oxygen in the ores, can be heated to say between 600° and 700° centigrade. The air from the rotary cooler and gas from the producer can pass by flues through a recuperator and be heated therein by the combustion products, passing in a reverse direction, to about say 1,000° centigrade, at which temperature they enter the furnace. The carbon-dioxide driven off from the second preheaters, may be sucked out by an ejector and carried to the incandescent zone of the gas-producer, or down the up-flue, or through the recuperator chambers by pipes to the incandescent zone of the said gas-producer at a temperature at which the carbon-dioxide becomes, in the presence of the carbon, converted to carbon-monoxide (without dilution by nitrogen) which is afterwards burned in the furnace to carbon dioxide and thereby reduces the inert nitrogen in the combustion products and permits of a much higher temperature of the reducng flame with the consumption of but one-third of the amount of fuel usually consumed.

In describing how my invention may be performed I will refer to the accompanying drawing which represents in elevation and more, or less, diagrammatically, the general arrangement of a plant adapted for carrying out the process in accordance with my said invention.

The raw ores and the necessary solid fluxing materials in the required proportions, are finely ground so as to pass, for example, through a sieve of a mesh of 60, or more, to the inch and are fed into any suitable preheater (indicated at A) wherein they are mixed by any suitable means (for example by a traveling drag-rabble), the coal, or other suitable fuel being likewise brought to a similar fine state of division and heated in a retort (indicated at $A^1$) by the waste heat from the recuperator F, to about 400° centigrade and the ores and fluxing materials to about 500° centigrade. The fuel is conveyed from the retort $A^1$ by any suitable air-tight conveyor (not shewn) to an air-tight valve $b^5$ through which it passes onto, and through, a distributor $b^6$ in the producer B to form the fuel-bed $b^7$. The finely divided ores and fluxes are passed by any suitable means such, for example, as by an air-tight elevator, not shewn, from the preheater A to a second preheater C which is over the furnace proper D. They are, in the preheater C, further mixed, (for example, by a rabble-calciner $c$) and heated to about 1,000° centigrade, which temperature however is reduced to about 850° centigrade by reason of the driving off of the carbon-dioxide from the calcium carbonate of the fluxes. The materials that are used as fluxes may be those that are required for cement less those that are already in the ores which change according to the nature of the substance in which the material is embedded. If required other cement making materials may be added, in their proper proportions, to the matrix materials which are heated in preheater C. At a temperature of over 850° centigrade the ores and fluxes are caused to pass, from the preheater C and distributed by a spreader $c^3$ in the form of a fine cloud of dust, into the furnace D, and subjected to the flame heat. The heat here being about 1,800° centigrade, or above that temperature, will cause the metallic particles to be rapidly smelted by the heat of the whirling flame derived from the almost nitrogen-free producer gas. The carbon-dioxide from the calcium carbonate is drawn out of the preheater C and from a preheater E for additional cement materials (shewn as being provided with a mixing rabble $e$) at a temperature of from about 850° to 1,000° centigrade and conveyed by the pipes $c^2$ and $e^4$ respectively, to the incandescent zone of the producer B, into which it issues from beneath the distributing hood $b^3$ shewn with air admitted by the pipe $b^4$ and meets the carbon of the fuel heated to considerably over 1,000° centigrade. The reaction between the carbon-dioxide and carbon at this temperature produces carbon-monoxide with which, of course, there is practically no nitrogen, although, as some fuel has to be supplied to the producer B to counteract the loss of heat due to the endothermic reaction from the formation of carbon-monoxide, the nitrogen in the air is used to burn this fuel and although it may accompany the producer gas into the furnace D it is so small in quantity as to be practically negligible, and does not interfere with the attainment of the requisite high temperature therein nor with the economy effected by the absence of the large amount of nitrogren inevitable with the quantity of air hitherto employed in making producer gas. The absence of this large amount of nitrogen from the process according to my invention also enables (with a great reduction in fuel) a much better obtainment of the required heat to smelt the cloud of preheated and finely divided ore fed into the furnace D, presenting a very large surface to the action of the heat and, besides lessening the time required for the operation, also facilitates the driving off in a gaseous state of volatile matter from the ores, such as sulphur phosphorus and carbon. If desired other metals, non-volatile at the temperature of this process, such for instance, as tungsten, manganese, chromium, cobalt, molybdenum, nickel, titanium, and vanadium, can be alloyed with the produced metal by introducing finely divided ores of the desired metal, or metals, into the preheater A and feeding them to the furnace D with the other materials.

As the temperature of the slag coming over from the crucible J is in excess of that desirable for cement clinker a quantity of cement-forming material is heated up to from about 850° to 1,000° centigrade, in the preheater E, heated by the otherwise waste heat of the combustion products from the furnace D and the liquid slag run onto the unfused fine cement-making material delivered into a rotatable clinkering drum G and the reaction, caused by the loss of heat in the high temperature slag, reduces the resultant temperature of the cement material to about 1,800° to 1,350° centigrade being the temperature of the resulting clinker which is then passed through a rotary cooler H through which cold air is pumped, the air passing around the drum G and through the pipe $g$ to the recuperator F and thence by the pipe $f$ to the bustle pipe $f^2$ to meet the gas arriving from the bustle pipe $b^2$ which is in communication with the producer B, through the flue $b$, the gas and air meeting, at burners arranged tangentially in the furnace D (as indicated at $d$) in any suitable number. The resultant cement clinker, cooled by the air in the rotary cooling tube H can be delivered to any suitable mill for pulverization to cement. After leaving the preheater E the waste heat now about 1500° centigrade may, if desired, pass through any suitable pipes, or conduits, into a glass making apparatus, or into a clay furnace such as is shewn and described in specification No. 154251, or to any other desired place, or be passed direct by the pipe $e^2$ to the preheater C above the furnace D arriving at the recuperator F at about 1300° centigrade and may if required heat the producer gas to 1000° centigrade, which may be effected by conveying the gas from the flue $b$ of producer B by means of a by-pass (not shown) into the recuperator F from which it subsequently passes through a pipe (not shown) to the bustle pipe $b^2$. The temperature of the combustion products falls in the recuperator F to about 1,100° centigrade at which temperature it may pass to a steam boiler (indicated at I) and give up its heat down to say about 650° which is sufficient to generate all power required throughout the plant) whence it passes below the preheater A of ore and fluxing material and below the coal, or other fuel, retort $A^1$ and thence to a chimney, or exhaust fan (at say about 220° centigrade) or to other places where its heat can be utilized, for example, to a desiccating plant for drying brine, for soda plant, or for desiccating milk, fish, fruit, vegetables, or the like. The steam from the boiler I can be used, if so desired, for power.

Iron requires to be tapped at 1600° centigrade and therefore it usually necessitates a flame temperature of nearly 1800° centigrade or over, at the burners $d$ but, in the process according to my invention, the furnace temperature is at once reduced by admixture with the dust cloud of finely divided ore and fluxing material so that sufficient heat is absorbed by the smelting operation to bring the furnace heat to about 1700° centigrade. It will be understood that the shape of the furnace D is such as will permit of the gases of combustion and the particles of the materials whirling around producing a vortex, or area of low pressure, in the centre of the furnace flame, into which vortex, or area, the finely divided ore and particles of fluxing material are delivered and spread out (by a mixer and spreader $c^5$) forming a cloud of fine dust and presenting very large surface to the flames, and the liquefied metal parts and slag produced roll slowly down the sides of the furnace whilst under the influence of the whirling flame in the furnace and pass into the crucible J. If desired air and gas combined in a burner such as $d$ can be blown into the lower part of the furnace D, above the level of the molten mass in the crucible J to reduce the viscosity of the fluid slags.

The combustion gases in the process according to my invention will not contain unburnt combustible and, as very little nitrogen passes into the furnace, very little nitrogen comes out, as the oxygen of the ore combines, without added air, with the carbon-monoxide of the producer gas. Besides this all volatilizable materials will pass off as gases which will carry away phosphorus, sulphur and carbon rendering the metal obtained almost, if not entirely, a steel, or steel alloy if ores of other metals are introduced into the furnace.

The metal thus obtained in the furnace D and therefrom in the crucible J, passes by gravitation down through the fused slags and and can be drawn off by a tapping outlet $j$, at the bottom of the said crucible and the slag and other materials will overflow and run off through the pipe $j^2$, into the rotating drum G meeting the cement making materials delivered into the said drum from the preheater E by the mixer $e^3$. The constitution of the cement clinker can be regulated by altering the proportions of fused and unfused materials fed into the preheaters C and E and the clinker so formed can be driven forward in the clinkering drum G and thence into the rotary cooling tube H through which cold air is driven and so is heated for eventual use in the furnace D and also in the producer B if so desired. Any cement material which may leave the cooler H can be pulverized which is preferably done in a hydrogen-charged atmosphere. The heat instead of being taken by the pipe $e^2$ direct from beneath the preheater E to the preheater C may, on its way thereto, be passed to other place where the heat can be further utilized; for instance, it can be taken to a furnace for producing glass in accordance with specification No. 154251, granted to me, and thereafter be taken to a glass moulding machine for example, in accordance with specification No. 154252, granted to me, but such glass making and moulding constitute no part of my present invention.

What I claim is:—

1. A metallurgical method which comprises spreading finely divided ore in a cloud into a generally upwardly moving column of reducing gas at a melting temperature.

2. A metallurgical method which comprises forming a vortex of reducing gases above melting temperature, feeding finely divided ore in a cloud to the vortex zone, depositing the reduced metal by centrifugal force upon a surrounding wall, and collecting the molten metal by gravity in a receptacle below the vortex zone.

3. An ore-reducing and cement-producing process comprising driving off carbon dioxide from cement-forming slag material, and other cement-forming material, passing said carbon dioxide through the bed of a gas producer to form carbon monoxide, blowing said carbon monoxide together with air tangentially into a furnace there forming a vortex of reducing gases, feeding finely divided ore and cement-forming slag material in a cloud into said vortex, depositing reduced metal and slag by centrifugal force upon a surrounding wall, collecting the molten metal and slag by gravity in a receptacle below the vortex zone, drawing off slag from the molten metal in the receptacle, and mingling and tumbling with said slag the cement-forming material first referred to, thereby forming a clinker.

4. In a process for smelting oxide ores to metals, the steps of introducing finely divided metallic ore together with a powdered cement-making fluxing material in a constant stream into the top of a furnace and spreading same in said top, introducing preheated air and fuel tangentially into the top of said furnace and there burning them in a whirling flame forming a vortex at its center, sucking the finely divided metallic ore and fluxing material into the vortex and there fusing it, then expelling the fused ore and flux material by centrifugal force to the walls of the furnace, and permitting the fused ore and fluxing material to roll down the walls of the furnace into a receptacle.

5. In a process for smelting oxide ores in a furnace as set forth in claim 4, the step of driving off carbon dioxide from metallic ore and fluxing material by heating prior to their introduction into the furnace.

6. In the process described in claim 4, preheating and freeing from carbon dioxide the ore and the flux material by the heat of the products of combustion.

7. A metallurgical process which comprises forming a vortex of reducing gases at a temperature sufficiently high to allow molten material to be tapped, spreading finely divided metallic ore in a cloud into said vortex, subjecting said metallic ore to such heat in said vortex that the iron particles are reduced, and expelling the molten material centrifugally through the action of the whirling gases, depositing said molten material upon a surrounding wall, whence it rolls down into a receptacle.

8. A metallurgical process which comprises forming a vortex of reducing gases largely consisting of carbon monoxide at a temperature sufficiently high to allow molten material to be tapped, spreading finely divided metallic ore in a cloud into the vortex, there reducing said ore by the action of said carbon monoxide, and subsequently expelling the molten material centrifugally through the action of the whirling gases, and depositing the molten material upon a surrounding wall, whence it rolls down into a receptacle.

In testimony whereof I have signed my name to this specification.

ALEXANDER FERGUSON.

prises forming a vortex of reducing gases largely consisting of carbon monoxide at a temperature sufficiently high to allow molten material to be tapped, spreading finely divided metallic ore in a cloud into the vortex, there reducing said ore by the action of said carbon monoxide, and subsequently expelling the molten material centrifugally through the action of the whirling gases, and depositing the molten material upon a surrounding wall, whence it rolls down into a receptacle.

In testimony whereof I have signed my name to this specification.

ALEXANDER FERGUSON.

Certificate of Correction.

It is hereby certified that in Letters Patent No. 1,567,934, granted December 29, 1925, upon the application of Alexander Ferguson, of London, England, for an improvement in "Processes and Apparatus for Reducing Ores and Producing Cement," errors appear in the printed specification requiring correction as follows: Page 2, line 81, strike out the word "necessary"; page 4, line 3, for the word "parts" read *particles;* and that the said Letters Patent should be read with these corrections therein that the same may conform to the record of the case in the Patent Office.

Signed and sealed this 26th day of January, A. D. 1926.

[SEAL.]

WM. A. KINNAN,
*Acting Commissioner of Patents.*

Certificate of Correction.

It is hereby certified that in Letters Patent No. 1,567,934, granted December 29, 1925, upon the application of Alexander Ferguson, of London, England, for an improvement in "Processes and Apparatus for Reducing Ores and Producing Cement," errors appear in the printed specification requiring correction as follows: Page 2, line 81, strike out the word "necessary"; page 4, line 3, for the word "parts" read *particles;* and that the said Letters Patent should be read with these corrections therein that the same may conform to the record of the case in the Patent Office.

Signed and sealed this 26th day of January, A. D. 1926.

[SEAL.]

WM. A. KINNAN,
*Acting Commissioner of Patents.*